(No Model.)
N. JEWETT.
HARVESTER REEL.
No. 284,304. Patented Sept. 4, 1883.
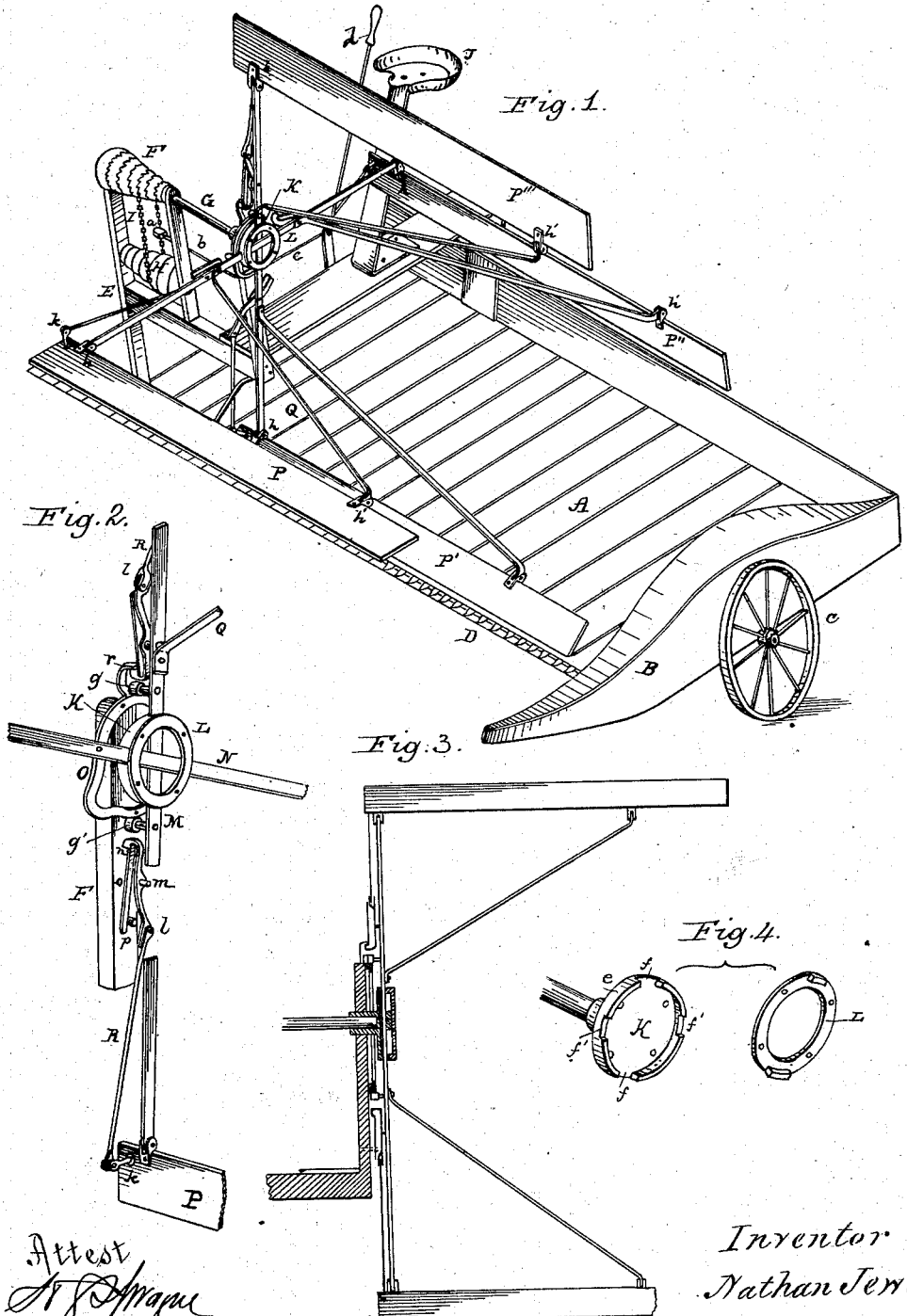
Attest
N. J. Sprague
Chas. J. Hunt.
Inventor
Nathan Jewett
By Thos. S. Sprague
Atty

UNITED STATES PATENT OFFICE.

NATHAN JEWETT, OF TOLEDO, OHIO, ASSIGNOR OF ONE-HALF TO WM. H. CRAY AND ALPHONSO E. ROOD, BOTH OF SAME PLACE.

HARVESTER-REEL.

SPECIFICATION forming part of Letters Patent No. 284,304, dated September 4, 1883.

Application filed December 8, 1882. (No model.)

*To all whom it may concern:*

Be it known that I, NATHAN JEWETT, of Toledo, in the county of Lucas and State of Ohio, have invented new and useful Improvements in Harvester-Reels; and I do hereby declare that the following is a full, clear, and exact description thereof, reference being had to the accompanying drawings, which form a part of this specification.

This invention relates to certain new and useful improvements in the construction and operation of that class of harvester-reels in which a movement of the blades is secured which renders the reel more certain in its operations, and which places it more directly under the control of the driver of the machine than is ordinarily the case.

The invention consists in the peculiar construction, arrangement, and operation of parts, as hereinafter more fully described and claimed.

Figure 1 is a perspective view of a grain-harvester platform with my improved reel attached. Fig. 2 is an enlarged perspective, showing in section the devices for controlling the motion of the reel other than the speed. Fig. 3 is a vertical central section through the reel shaft and head. Fig. 4 is a detached perspective of the reel head and cap.

The reel which I now proceed to describe is especially designed to be used upon harvesters which are provided with carriers and self-binders.

In the accompanying drawings, A represents the platform, B the divider-board, C the grain-wheel at the end of the divider-board, and D the cutters and cutter-bar, which are all of the usual construction. A standard and frame, E, is secured near the inner end of the platform, and near its front edge, designed to support the reel and its operating mechanism.

F is a conical pulley secured to the reel-shaft G, which is supported as shown in the frame E, and H is another conical pulley secured to a counter-shaft, the ends of which are properly journaled in the standard and frame, to which counter-shaft motion may be communicated from the driving-wheel of the harvester (not shown) in any of the known and more preferred ways.

I is a chain through which the motion of the pulley H is communicated to the reel-shaft. $a$ is a guide or loose clamp. This guide or loose clamp is rigidly secured to an arm, $b$, and this is connected by a joint with the arm $c$, which in turn is pivotally secured to the lever $d$, the end of which is within reach of the driver's seat J, and the parts are so constructed that by the movement of the shipping-lever $d$ to the front or rear the chain is shifted upon the pulleys to vary the speed of the reels, as may be desired or required by the different conditions of the grain being cut.

I do not desire to confine myself to the precise construction of the conical pulleys shown in the drawings, as cone-pulleys or other known devices for changing the speed may be employed for the same purposes without departing from the spirit of my invention.

Secured to the overhanging end of the reel-shaft G is a disk, K, provided with a flange, $e$, and four channels or recesses, $f f'$, so that one of the arms lying in the deeper recesses allows the other arm to lie in the more shallow recesses, where they are confined by means of the collar L in such a manner as not to prevent a free reciprocating motion thereof. The arm M is first placed in the hub and the arm N above it, and to each of these arms is secured friction-rollers, as $g g'$, which, in the rotation of the arms, travel around the edge of the cam O, which is secured to the frame E, and by means of these friction-rollers and the cam the arms are elongated or projected farther through the hub at one point in the rotation and retracted at another point of the rotation. To the outer ends of these arms M N are secured the reel-heads P P' P'' P''', one end thereof being secured to the arm directly by means of a rule or knuckle joint, $h$, while the opposite end is secured by a similar knuckle-joint, $h'$, to the brace Q, the other end of which is bolted to the arm itself. In the rotation of the reel, that reel-blade P which is upon the front end of that arm which is at the time horizontal is in line with said arm. In the further rotation of the reel-head this blade assumes the position of the one marked P'. The next position is shown in the one marked P'', while in the last position it is distinctly shown in the one marked P'''. In the rotation of the reel, the reel-head strikes the grain in front of the cutter-bar, bending the top of the grain over toward the platform, and in so doing, in the continued rotation of the reel, this blade commences to feather, as at P': In the further rotation of the reel, the feathering of the blade in action takes place in its passage to the rear of the platform, where it assumes the position of P'', and after it has passed over the grain on the platform, in the further rotation of the blade, it assumes a vertical position above the arm, as shown in the one marked P''', and at the completion of the revolution the blade is upon the same horizontal plane as that at the time being of the horizontal arm, and as indicated by the one marked P. The means by which the foregoing-described functions are respectively accomplished are as follows, to wit: To each one of these blades P is secured a post, $k$, and to each one of these posts is pivotally secured the jointed connecting-rod R, (which is provided with a lock or rule joint, $l$,) pivoted, upon the bolt $m$, to the frame. This jointed lever R turns back upon itself, as shown at $n$, terminating in an arm, $o$, which engages with a pin, $p$, secured to the frame, as shown in Fig. 2. In the rotation of the reel-arms, when the reel-blades have arrived at the point over the knife-guards, as shown in P', the arm $o$ of the lever R strikes the pin P and unlocks the joint $l$, which allows the reel-blades to assume the next position, (shown at P''.) At this point the bend $n$ of this jointed lever strikes the pin $r$, which reverses by locking the rule-joint $l$, which compels the blade to assume the position shown in P''', which position is continued until the position shown in P' is again reached. By this construction, as soon as the reel-blade has performed its duty in forcing the grain against the cutter and giving it the inclination to compel it to fall upon the platform, (which is provided with a carrier to deliver the grain to the binder,) the reel-blades are successively carried over the grain, without disturbing it in its travel upon the carrier, while in the continued rotation of the reel they are again successively brought into operation at the front of the cutter-bar. By the means employed, as each reel-blade is brought into position, the arms which support such blades are projected through the hub, whereby the reel-blades are projected sufficiently in front of the cutter-bar to catch and sweep the grain toward the advancing cutter-bar and render the operation of cutting the grain, under all its known conditions, more perfect than can be done with reels of the ordinary construction. The projecting and retracting cam is so placed that when each of the arms is horizontal they are central in the hub, and the moment the blade at the time in front rotates below the horizontal line, at that moment the projection to the front of the arms sustaining it commences, and this projection is continued until the half-revolution is fully complete, when the retraction commences by the projection of the other arm.

What I claim as my invention is—

1. In a harvester-reel, a hub composed of a disk having guides and a collar adapted to be secured thereto, reciprocating arms operating in said guides and carrying blades and friction-rollers, as shown, and a cam against which the said rollers impinge to automatically throw one of the blades in the direction of the hub and the other blade of the same arm in the opposite direction, all combined and operating as set forth.

2. In a harvester-reel, the combination of the arms M N, having a reciprocating movement, substantially as described, hub composed of the disk K and ring L, the friction-wheels $g$ $g'$, with the cam O, the parts being constructed, arranged, and operating substantially as and for the purposes specified.

3. The combination, in a harvester-reel, of the arms M N, having a reciprocating movement, substantially as described, the hub K L, friction-rollers $g$ $g'$, cam O, and reel-blades P P' P'' P''', secured by knuckle-joints to said arms, and the braces Q, substantially as and for the purposes described.

4. As a means for compelling the reel-blades P P' P'' P''' to feather or fold and unfold, the jointed rods R, pins $p$ $r$, and the overhanging arm $o$, the parts being arranged and operating substantially as specified.

NATHAN JEWETT.

Witnesses:
 H. S. SPRAGUE,
 E. I. SCULLY.